(12) United States Patent
Choi et al.

(10) Patent No.: US 8,977,260 B1
(45) Date of Patent: Mar. 10, 2015

(54) PREVENTING CLONE DEVICE REGISTRATION IN A WIRELESS COMMUNICATION SYSTEM

(75) Inventors: Heesook Choi, Foster City, CA (US); Travis Edward Dawson, San Francisco, CA (US)

(73) Assignee: Sprint Communication Company L.P., Overland Park, KS (US)

( * ) Notice: Subject to any disclaimer, the term of this patent is extended or adjusted under 35 U.S.C. 154(b) by 760 days.

(21) Appl. No.: 12/759,843

(22) Filed: Apr. 14, 2010

(51) Int. Cl.
*H04W 4/00* (2009.01)

(52) U.S. Cl.
USPC ..... 455/435.1; 455/410; 455/411; 455/432.1; 455/432.2; 455/432.3; 455/433; 455/434; 455/435.2; 455/435.3; 455/456.1; 455/456.2; 455/456.3; 455/456.4; 455/456.5; 455/456.6

(58) Field of Classification Search
CPC ....... H04W 12/06; H04W 8/26; H04W 60/00; H04W 8/12; H04W 12/12; H04W 48/04; H04W 60/02; H04W 8/04; H04L 63/107; H04M 1/66; H04M 15/8033; G06Q 20/40
USPC ......... 455/410, 411, 432.1–435.3, 456.1–457
See application file for complete search history.

(56) References Cited

U.S. PATENT DOCUMENTS

| | | | |
|---|---|---|---|
| 5,343,529 A | | 8/1994 | Goldfine et al. |
| 5,448,760 A | | 9/1995 | Frederick |
| 6,097,938 A | * | 8/2000 | Paxson .......................... 455/410 |
| 6,466,777 B1 | * | 10/2002 | Urita ............................. 455/410 |
| 6,839,434 B1 | * | 1/2005 | Mizikovsky .................. 380/247 |
| 6,928,277 B1 | * | 8/2005 | Ene ................................. 455/411 |
| 7,333,797 B2 | * | 2/2008 | Thorson ........................ 455/410 |
| 7,555,285 B2 | * | 6/2009 | Thorson et al. ............... 455/411 |
| 8,509,735 B2 | * | 8/2013 | Thorson et al. ............... 455/410 |
| 2001/0055392 A1 | | 12/2001 | McDonnell et al. |
| 2003/0217137 A1 | | 11/2003 | Roese et al. |
| 2005/0282529 A1 | * | 12/2005 | Thorson et al. ............... 455/415 |
| 2006/0009195 A1 | * | 1/2006 | Itoh ................................. 455/411 |
| 2007/0184817 A1 | * | 8/2007 | Karaoguz ...................... 455/411 |
| 2008/0096529 A1 | | 4/2008 | Zellner |
| 2008/0120707 A1 | | 5/2008 | Ramia |

FOREIGN PATENT DOCUMENTS

WO    WO 2004/079499 A2 *   9/2004

OTHER PUBLICATIONS

USPTO Office Action Summary mailed Nov. 15, 2010 from U.S. Appl. No. 12/369,293.

* cited by examiner

Primary Examiner — Liton Miah

(57) ABSTRACT

Embodiments disclosed herein provide systems and methods that prevent clone devices from registering with a wireless communication network. In a particular embodiment, a wireless device exchanges communications with a wireless communication network during an initial period of time. The wireless device transfers an initial location of the wireless device during the initial period of time to an authorization system for the wireless communication network. During a second period of time, the wireless device transfers a registration request indicating a confirmation location and a location of the wireless device during the second period of time to the authorization system. The authorization system processes the registration request to validate the confirmation location based on the initial location. If the confirmation location is validated based on the initial location, then the authorization system allows the wireless device to access the wireless communication network during the second period of time.

16 Claims, 8 Drawing Sheets

PREVENTING CLONE DEVICE REGISTRATION IN A WIRELESS COMMUNICATION SYSTEM

TECHNICAL BACKGROUND

Wireless devices, such as cellular phones, communicate with other devices and systems using wireless communication networks. In order to use a wireless communication network, a wireless device must first register with the wireless communication network. The registration process includes a registration request transferred from the wireless device to the wireless communication network. The registration request includes identifiers unique to the wireless device. Using the identifiers, the network can identify the wireless device and determine whether the wireless device is allowed to access the wireless communication network.

The unique identifiers of a genuine wireless device can be copied to create a clone device. The clone device is thereby able to transfer a registration request to the wireless communication network that is identical to the registration request that would be transferred from the genuine wireless device. Therefore, the wireless communication network cannot recognize a difference between the registration request transferred from the genuine wireless device and the registration request transferred from the clone device. Consequently, the wireless communication network will allow the clone device to register with the wireless communication network as if the clone device was the genuine wireless device.

OVERVIEW

Embodiments disclosed herein provide systems and methods that prevent clone devices from registering with a wireless communication network. In a particular embodiment, a wireless device exchanges communications with a wireless communication network during an initial period of time. The wireless device transfers an initial location of the wireless device during the initial period of time to an authorization system for the wireless communication network. During a second period of time, the wireless device transfers a registration request indicating a confirmation location and a location of the wireless device during the second period of time to the authorization system. The authorization system processes the registration request to validate the confirmation location based on the initial location. If the confirmation location is validated based on the initial location, then the authorization system allows the wireless device to access the wireless communication network during the second period of time.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
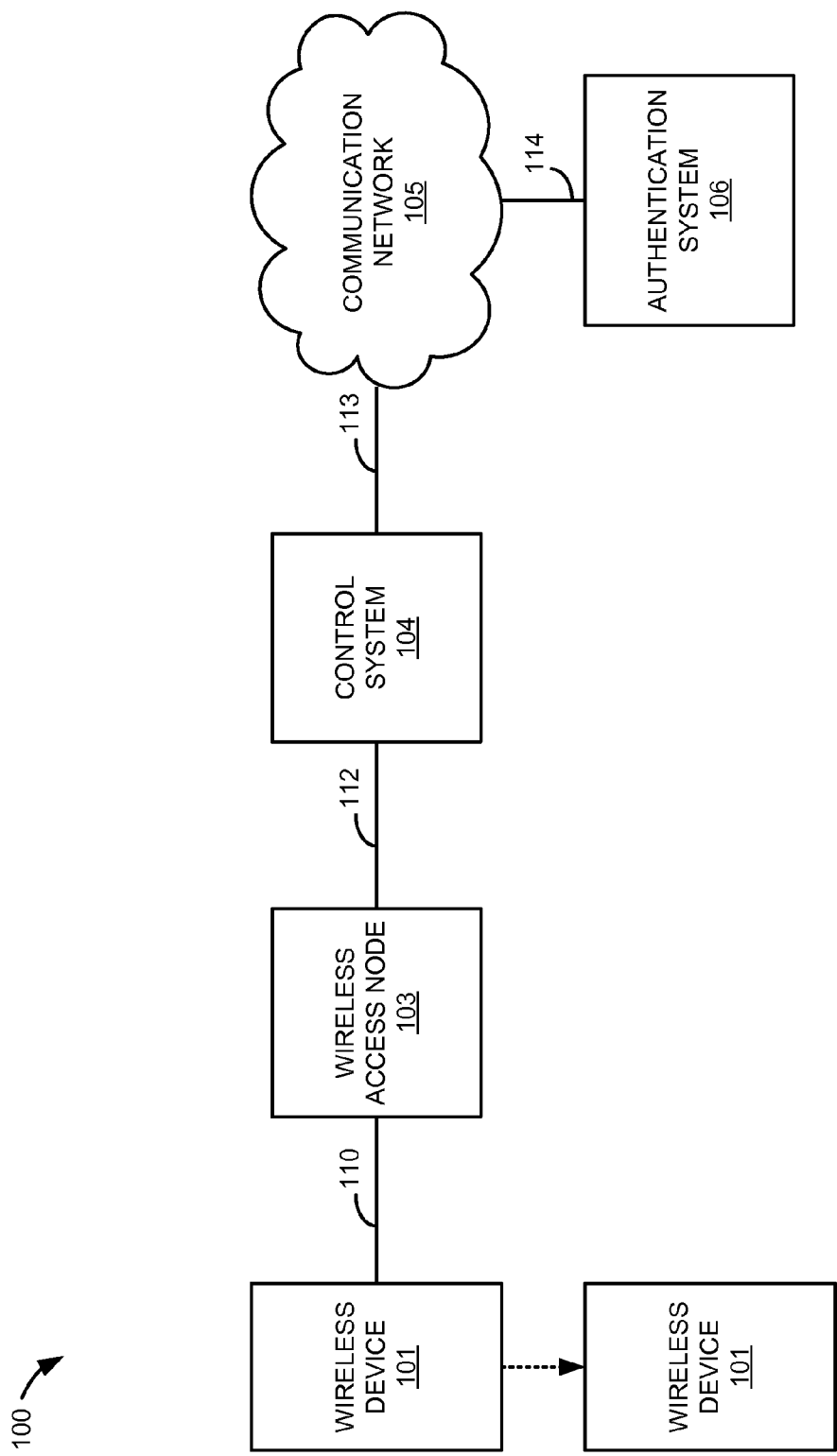
FIG. 1 illustrates a wireless communication system.

FIG. 1 illustrates wireless communication system 100. Wireless communication system 100 includes wireless communication device 101, wireless access node 103, communication control system 104, communication network 105, and authentication system 106. Although shown external to communication network 105, communication network 105 may include wireless access node 103, control system 104, and authorization system 106 as part of a wireless communication network but may also include other access nodes and systems. Wireless device 101 and wireless access node 103 communicate over wireless link 110. Wireless access node 103 and control system 104 communicate over communication link 112. Control system 104 and communication network 105 communicate over communication link 113. Communication network 105 and authentication system 106 communicate over communication link 114.

In operation, wireless device 101 may need to register itself with communication network 105 in order to exchange communications with communication network 105 via wireless access node 103 and control system 104. In order to register, wireless device 101 may send identifying information to authentication system 106 as part of a registration request. The identification may be an electronic serial number (ESN) for wireless device 101 but may also be some other type of identifier for wireless device 101.

Authentication system 106 will process the identifying information to determine whether wireless device 101 is allowed to register with communication network 105. For example, authentication system 106 will determine whether wireless device 101 belongs to a customer of a wireless communication service provided by communication network 105, whether the customer is up to date on payments of his or her bills, or any other reason that wireless device 101 may or may not be allowed to register with communication network 105. Therefore, if authentication system 106 finds no reason not to allow wireless device 101 to register on communication network 105, then authentication system registers wireless device 101 to operate on communication network 105.

Unfortunately, other wireless devices can copy, or clone, the identifying information of wireless device 101. If such a situation arises, then authentication system cannot tell the difference between wireless device 101 and the clone. Thus, authentication system 105 does not discriminate between the two devices when allowing network registration.

Figure 2:
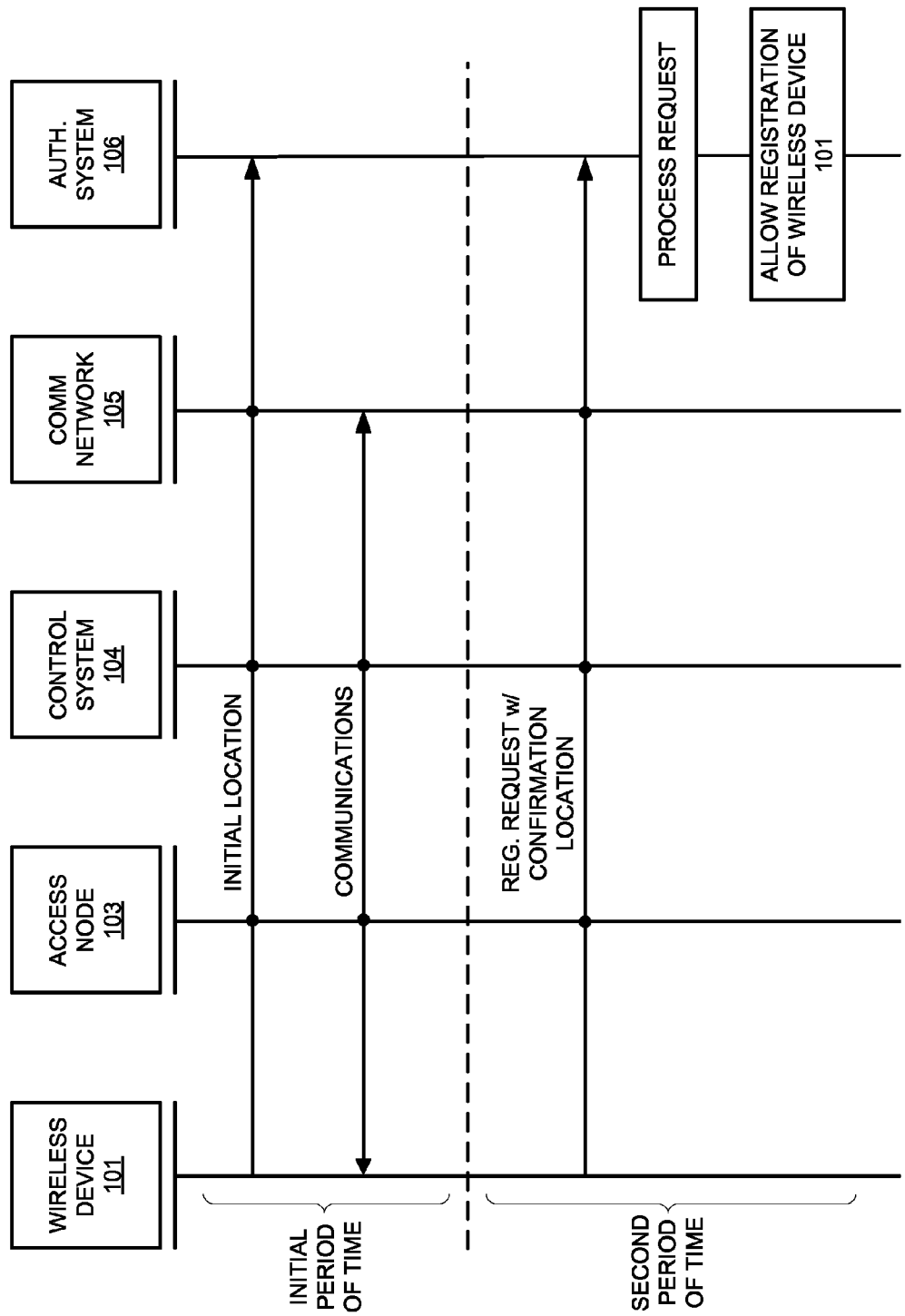
FIG. 2 illustrates the operation of a wireless communication system.

FIG. 2 is a sequence diagram illustrating the operation of wireless communication system 100. The sequence begins with wireless device 101 transferring an initial location of wireless device 101 during an initial period of time to authorization system 106. Wireless device 101 also exchanges communications with communication network 105 during the initial period of time. The initial location may be transferred along with or included with a network registration request but may also be transferred by itself or along with some other communication to authorization system 106. The initial period of time may be when wireless device 101 is first activated for use on communication network 105 and has no previous location to report.

Between the initial period of time and a second period of time mobile device may move from one location to another as indicated by the dotted arrow in FIG. 1. The other location may also be serviced by access node 103, but may be serviced by another access node.

During the second period of time, wireless device 101 transfers a registration request to authorization system 106. The registration request indicates a confirmation location and a location of wireless device 101 during the second period of time. The confirmation location is the most recent location that wireless device 101 transferred to authorization system 106. In this example, wireless device 101 most recently transferred the initial location to authorization system 106. Thus, the confirmation location should be the same as the initial location. Authorization system 106 processes the registration request to validate the confirmation location based on the initial location. The validation of the confirmation location may determine whether the confirmation location matches the initial location. If the confirmation location is validated based on the initial location, authorization system 106 allows wireless device 101 to register with communication network 105 during the second period of time.

In some embodiments, during a third period of time, mobile device 101 transfers a second registration request indicating a second confirmation location and a location of wireless device 101 during the third period of time to authorization system 106. The second confirmation location is the most recent location that wireless device 101 transferred to authorization system 106. In this example, wireless device 101 most recently transferred the location of wireless device 101 during the second period of time to authorization system 106, thus, the second confirmation location should be the same as the location of wireless device 101 during the second period of time. Authorization system 106 processes the second registration request to validate the second confirmation location based on the location of wireless device 101 during the second period of time. The validation of the second confirmation location may determine whether the confirmation location matches the location of wireless device 101 during the second period of time. If the second confirmation location is validated based on the location of the wireless device during the second period of time, authorization system 106 allows wireless device 101 to register with communication network 105 during the third period of time. This process may continue indefinitely as wireless device 101 may be required to periodically register with communication network 105.

Therefore, whether wireless device 101 is allowed to register with communication network 105 depends on whether wireless device 101 transfers the correct confirmation location to authorization system 106. Consequently, wireless device 101 must store at least the most recent location that wireless device 101 transferred to authorization system 106 in order to transfer that location as a confirmation location during a subsequent registration request. If wireless device 101 does not know the correct previous location of wireless device 101, as could be the case if wireless device 101 is a cloned device, then authorization system will not allow wireless device 101 to register with the wireless communication network.

Additionally, the process may continue regardless of whether wireless device has powered off or otherwise lost connectivity. In either of those cases, the process above will continue the same way with wireless device 101 and authentication system 106 using previous location information from when wireless device 101 was last able to register with the wireless communication network. Therefore, the initial period of time may only occur once, which is when wireless device 101 is activated to operate on the wireless communication network, and not every time wireless device 101 regains connectivity with the wireless communication network.

In other embodiments, authorization system 106 may validate other previous locations of wireless device 101 rather than the most recent location. Alternatively, authorization system 106 may validate multiple previous locations of wireless device 101, such as the two or three most recent previous locations of wireless device 101.

The location of wireless device 101 may be determined based on obtaining coordinates using the Global Positioning System (GPS), based on the location of wireless access node 103, or any other way of determining a location of wireless device 101. The location of wireless device 101 may vary in precision and, thus, have varied margins for error. For example, the coordinates may be the exact geographic coordinates of wireless device 101, but may also be a more general area for wireless device 101, such as the area serviced by access node 103, a city, a state, or a region.

In some cases, a clone device may be located close enough to wireless device 101 that the clone device falls within the margin for error in the location of wireless device 101. In those cases, as long as the clone device remains close enough to wireless device 101 to stay within the margin for error, then the clone device may be able to transfer the correct confirmation location to authorization system 106. For example, if the location of wireless device 101 is only precise enough to show that wireless device 101 is communicating with access node 103, then a clone device need only be communicating with access node 103 to have the same location as wireless device 101. Transferring the correct confirmation location to authorization system 106 may allow the clone device to register with the wireless communication network.

Figure 3:
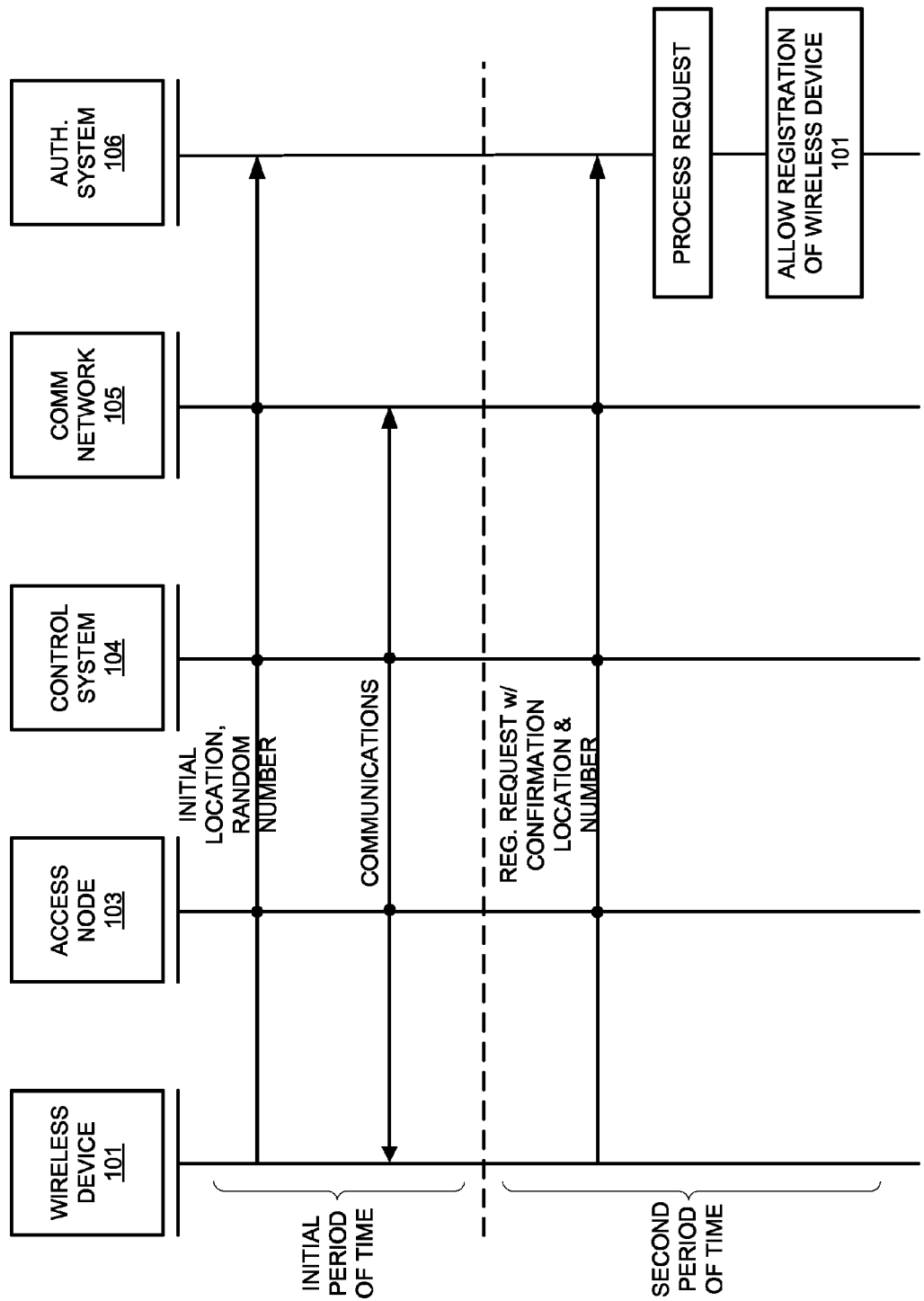
FIG. 3 illustrates the operation of a wireless communication system.

FIG. 3 is a sequence diagram illustrating the operation of wireless communication system 100. The sequence begins with wireless device 101 transferring an initial location of wireless device 101 during an initial period of time and an initial random number to authorization system 106. Wireless device 101 also exchanges communications with communication network 105 during the initial period of time. The initial location and random number may be transferred along with or included with a network registration request but may also may be transferred by themselves or along with some other communication to authorization system 106. The initial period of time may be when wireless device 101 is first activated for use on communication network 105 and has no previous location or random number to report.

During a second period of time, wireless device 101 transfers a registration request to authorization system 106. The registration request indicates a confirmation location, a confirmation number, a location of wireless device 101 during the second period of time, and a second random number. The confirmation location and confirmation number are the most recent location and random number that wireless device 101 transferred to authorization system 106. In this example, wireless device 101 most recently transferred the initial location and the initial random number to authorization system 106. Thus, the confirmation location and confirmation number should be the same as the initial location and initial random number. Authorization system 106 processes the registration request to validate the confirmation location and the confirmation number based on the initial location and the initial random number. The validation may determine whether the confirmation location and confirmation number matches the initial location and initial random number. If both the confirmation location and the confirmation number are validated based on the initial location and initial random number, then authorization system 106 allows wireless device 101 to register with communication network 105.

Therefore, whether wireless device 101 is allowed to register with the wireless communication network depends on whether wireless device 101 transfers the correct confirmation location and confirmation number to authorization system 106. Consequently, wireless device 101 must store at least the most recent random number that wireless device 101 transfers to authorization system 106 in order to transfer that number as a confirmation number during a subsequent registration request. If wireless device 101 does not know the correct confirmation location and confirmation number, then authorization system will not allow wireless device 101 to register with the wireless communication network. Hence, even if wireless device 101 is a clone device in the same location as the actual device, wireless device 101 would not have the correct confirmation number needed for network registration allowance.

In some embodiments, authorization system 106 may validate other previous random numbers generated by wireless device 101 rather than the most recent random number. Alternatively, authorization system 106 may validate multiple previous random numbers generated by wireless device 101, such as the two or three most recent previous random numbers generated by wireless device 101.

Similar to that stated above regarding FIG. 2, the process may repeat indefinitely with mobile device 101 needing to transfer the correct confirmation location and confirmation number, along with new location and random number information, in order to register with the wireless communication network.

Additionally, the process may continue regardless of whether wireless device has powered off or otherwise lost connectivity. In either of those cases, the process above will continue the same way with wireless device 101 and authentication system 106 using previous location and random number information from when wireless device 101 was last able to register with the wireless communication network. Therefore, the initial period of time may only occur once, which is when wireless device 101 is activated to operate on the wireless communication network, and not every time wireless device 101 regains connectivity with the wireless communication network.

Referring back to FIG. 1, wireless communication device 101 comprises Radio Frequency (RF) communication circuitry and an antenna. The RF communication circuitry typically includes an amplifier, filter, modulator, and signal processing circuitry. Wireless device 101 may also include a user interface, memory device, software, processing circuitry, or some other communication components. Wireless device 101 may be a telephone, computer, e-book, mobile Internet appliance, wireless network interface card, media player, game console, or some other wireless communication apparatus—including combinations thereof.

Wireless access node 103 comprises RF communication circuitry and an antenna. The RF communication circuitry typically includes an amplifier, filter, RF modulator, and signal processing circuitry. Wireless access node 103 may also comprise a router, server, memory device, software, processing circuitry, cabling, power supply, network communication interface, structural support, or some other communication apparatus. Wireless access node 103 could be a base station, Internet access node, telephony service node, wireless data access point, or some other wireless communication system—including combinations thereof.

Communication control system 104 comprises a computer system and communication interface. Communication control system 104 may also include other components such a router, server, data storage system, and power supply. Communication control system 104 may reside in a single device or may be distributed across multiple devices. Communication control system 104 is shown externally to wireless access node 103, but system 104 could be integrated within the components of wireless access node 103. Communication control system 104 could be a mobile switching center, network gateway system, Internet access node, application server, service node, or some other communication system—including combinations thereof.

Communication network 105 comprises telephony switches, wireless access nodes, Internet routers, network gateways, computer systems, communication links, or some other type of communication equipment—including combinations thereof.

Authorization system 106 comprises a computer system and communication interface. Authorization system 106 may also include other components such as a router, server, data storage system, and power supply. Authorization system 106 may reside in a single device or may be distributed across multiple devices. Authorization system 106 is shown externally to communication network 105, but system 106 could be internally connected to components of communication network 105. Authorization system 106 could be a network gateway system, Internet access node, application server, service node, or some other communication system—including combinations thereof.

Wireless link 110 uses the air or space as the transport media. Wireless link 110 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format. Communication links 112-114 use metal, glass, air, space, or some other material as the transport media. Communication links 112-114 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication links 112-114 could be direct links or may include intermediate networks, systems, or devices.

Figure 4:
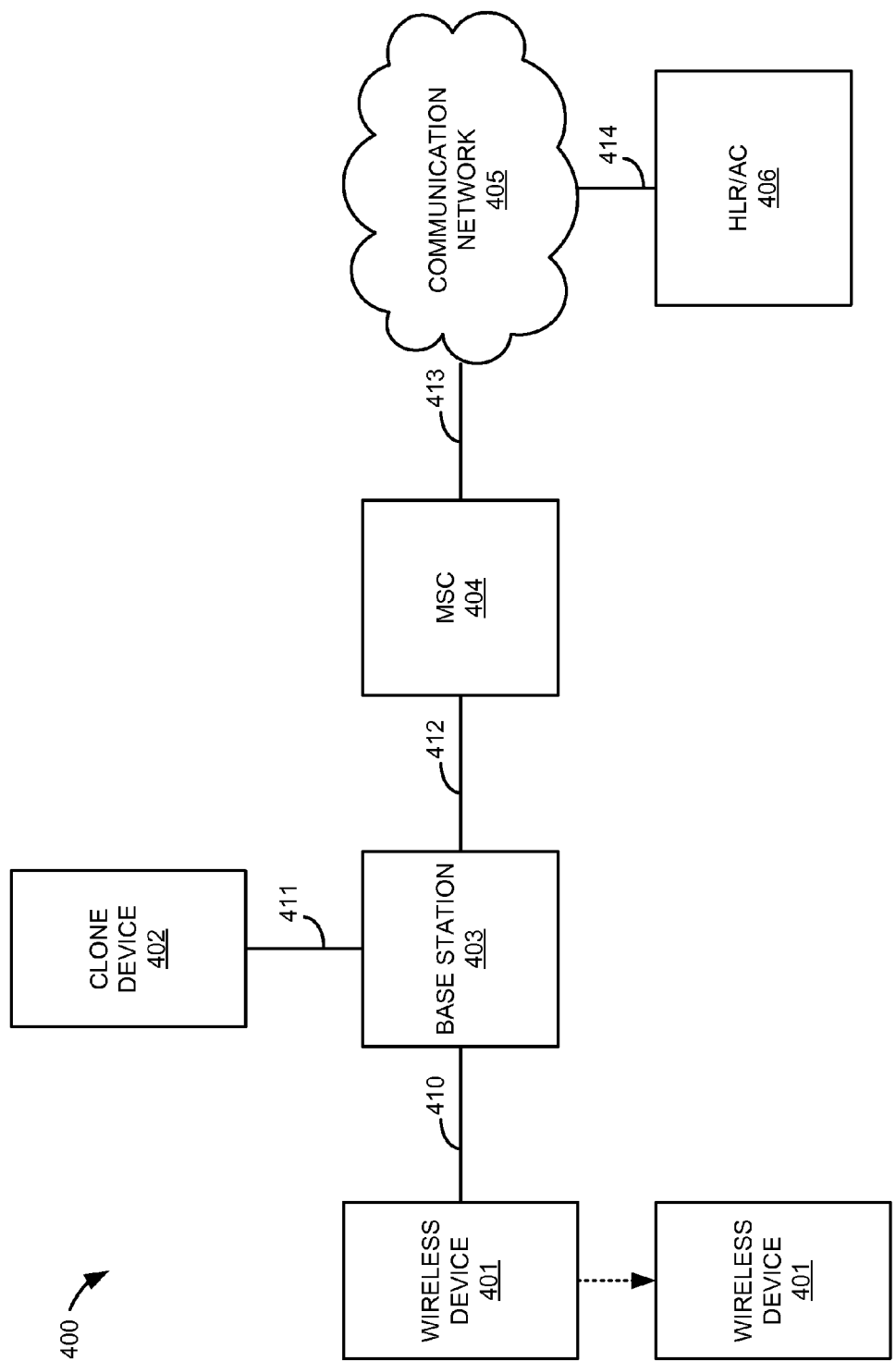
FIG. 4 illustrates a wireless communication system.

FIG. 4 illustrates wireless communication system 400. Wireless communication system 400 includes wireless communication device 401, clone device 402, base station 403, mobile switching center (MSC) 404, communication network 405, and home location register/authorization center (HLR/AC) 406. Although shown external to communication network 405, communication network 405 may include base station 403, MSC 404, and HLR/AC 406 as part of a wireless communication network but may also include other access nodes and systems. Wireless device 401 and base station 403 communicate over wireless link 410. Clone device 402 and base station 403 communicate over wireless link 411. Base station 403 and MSC 404 communicate over link 412. MSC 404 and communication network 405 communicate over link 413. Communication network 405 and HLR/AC communicate over link 414.

Wireless device 401 is a genuine communication device that is supposed to be able to access the wireless communication network. Clone device 402 is a wireless device that has cloned the identification of wireless device 401. Clone device 402 may have copied the electronic serial number (ESN), authorization key (A-key), mobile station ID (MSID), and the preferred roaming list (PRL) of wireless device 401 in order to gain access to the wireless communication network.

Figure 5:
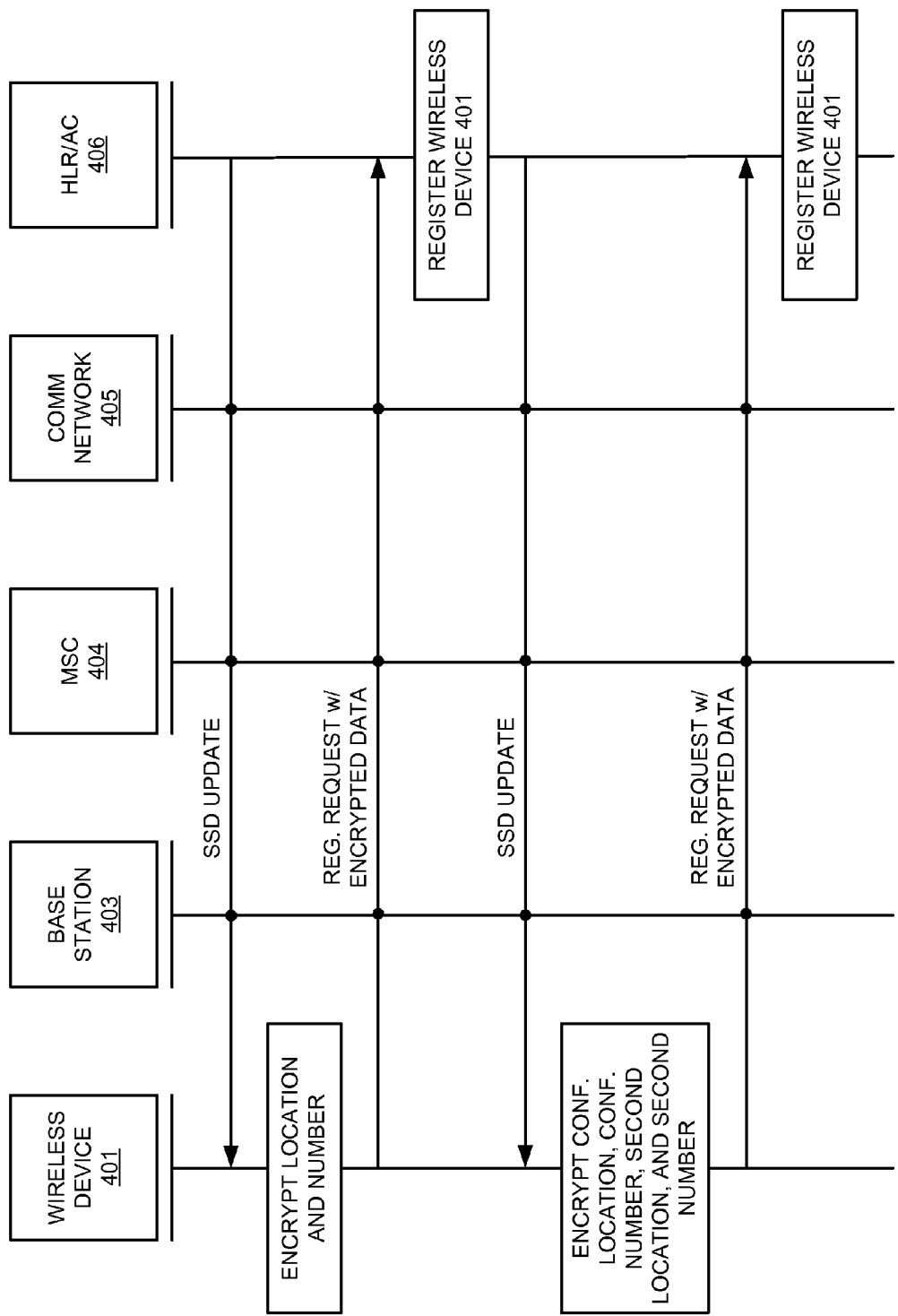
FIG. 5 illustrates the operation of a wireless communication system.

FIG. 5 is a sequence diagram illustrating the operating of wireless communication system 400 with regards to wireless device 401. The sequence begins with wireless device 401 receiving a shared secret data (SSD) update consisting of a random number (RAND_SSD) from HLR/AC 406 during the initial period of time. During the initial period of time wireless device 401 determines a location of wireless device 401, generates a random number, and stores the location and number for later use. Wireless device 401 then uses the Cellular Authentication and Voice Encryption (CAVE) algorithm, with the A-key, ESN, and RAND_SSD of wireless device 401 as inputs to the algorithm, to derive SSD_A and SSD_B. Wireless device 401 uses SSD_A to encrypt the initial location of wireless device 401 during the initial period of time and a random number generated by wireless device 401 during the initial period of time. The encrypted information is transferred to HLR/AC 406 as part of an initial registration request for access to the wireless communication network. The registration request may include a signature to confirm the integrity of the registration request. HLR/AC 406 decrypts the registration request to verify wireless device 401 and stores the initial location and initial random number for future use. HLR/AC then allows wireless device 401 to register with the wireless communication network.

Between the initial period of time and a second period of time, wireless device 401 may move from one location to another as indicated by the dotted arrow in FIG. 4. Although, wireless device 401 does not have to move in order to register properly as described herein.

During the second period of time, wireless device 401 determines a second location of wireless device 401, generates a second random number, and stores the second location and random number for later use. Wireless device 401 may use SSD_A to encrypt a confirmation location, a confirmation number, the second location, and the second random number. The confirmation location is the same as the initial location stored in wireless device 401. The confirmation number is the same as the initial random number stored in wireless device 401. Wireless device 401 transfers a second registration request with the encrypted information to HLR/AC 406. The second registration request may include a signature to confirm the integrity of the second registration request.

HLR/AC 406 receives the second registration request and decrypts the information. HLR/AC 406 then validates the confirmation location and confirmation number based on the initial location and initial random number stored in HLR/AC 406. In this example, the confirmation location and number match the initial location and number stored in HLR/AC 406. Therefore, HLR/AC 406 allows wireless device 401 to register with the wireless communication network.

Wireless device 401 will need to register with the wireless communication network periodically while turned on. Wireless device 401 will continue to send the previous location and random number as a confirmation location and number with each subsequent registration request. Therefore, every registration request from wireless device 401 needs to be validated by HLR/AC 406. If the confirmation location and confirmation number match the location and number that was sent with the previous registration request, then wireless device 401 is allowed to register with the wireless communication network.

Figure 6:
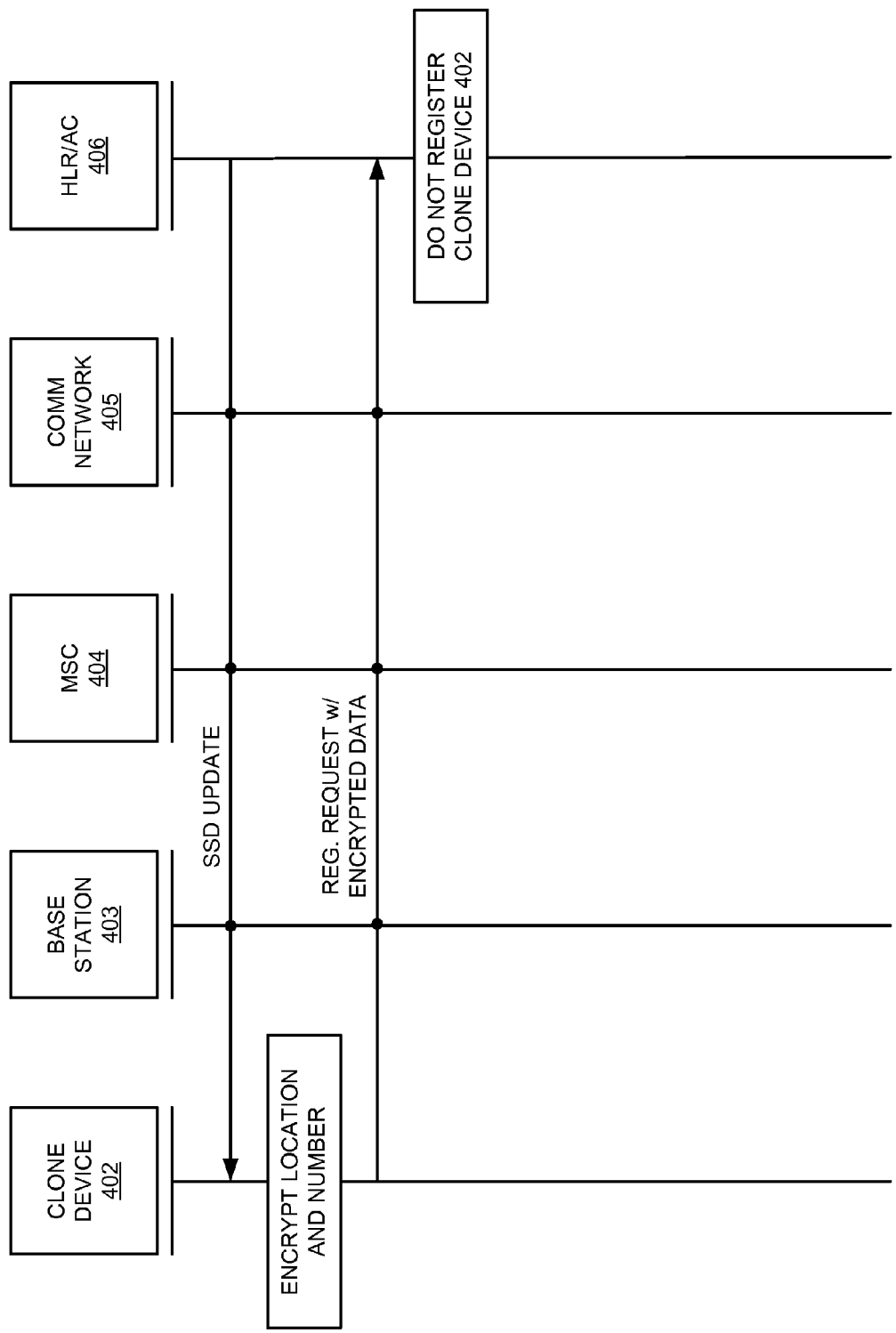
FIG. 6 illustrates the operation of a wireless communication system.

FIG. 6 is a sequence diagram illustrating the operating of wireless communication system 400 with regards to clone device 402. In this example, wireless device 401 is operating as described above for FIG. 5. The sequence may begin with clone device 402 receiving a RAND_SSD in an SSD update from HLR/AC 406. Clone device 402 then derives a new SSD_A using the CAVE algorithm, with the cloned A-key, cloned ESN, and the second RAND_SSD as inputs. Alternatively, if clone device 402 is capable of encrypting registration information with a confirmation location and number then the SSD update is unnecessary. At this point clone device 402 may or may not have the capability to encrypt a confirmation location or a confirmation number. If clone device 402 has the ability, then clone device will encrypt a confirmation location and confirmation number to include when transferring a registration request. If clone device 402 does not have the ability to include a confirmation location and confirmation number, then clone device 402 transfers a registration request without a confirmation location and confirmation number.

Upon receiving the registration request from clone device 402, HLR/AC 406 decrypts the information in the registration request and attempts to validate the included confirmation location and confirmation number. If there is no included confirmation location and confirmation number, then HLR/AC 406 declines to allow registration of clone device 403. Likewise, if the registration request includes a confirmation location and confirmation number, then HLR/AC 406 attempts to validate the confirmation location and confirmation number.

To validate the confirmation location and confirmation number HLR/AC 406 determines whether the confirmation location and confirmation number match the most recent location and number that was sent to HLR/AC 406 by wireless device 401. In this example both the confirmation location and confirmation number do not match the location and number stored on HLR/AC 406 because clone device 402 does not know the most recent location of wireless device 401 and does not know the most recent random number generated by wireless device 401. Although, as stated in a previous example, if clone device 402 is within the margin of error for the location of wireless device 401, then the confirmation location sent by clone device 402 may match the most recent location of wireless device 401. However, even if the confirmation location matches the most recent location of wireless device 401, HLR/AC 406 only allows registration if both the confirmation location and confirmation location are validated. Therefore, since at least one of the confirmation location or confirmation number sent by clone device 402 does not match the most recent location and number stored in HLR/AC 406 for wireless device 401, HLR/AC 406 does not allow clone device 402 to register with the wireless communication network.

Figure 7:
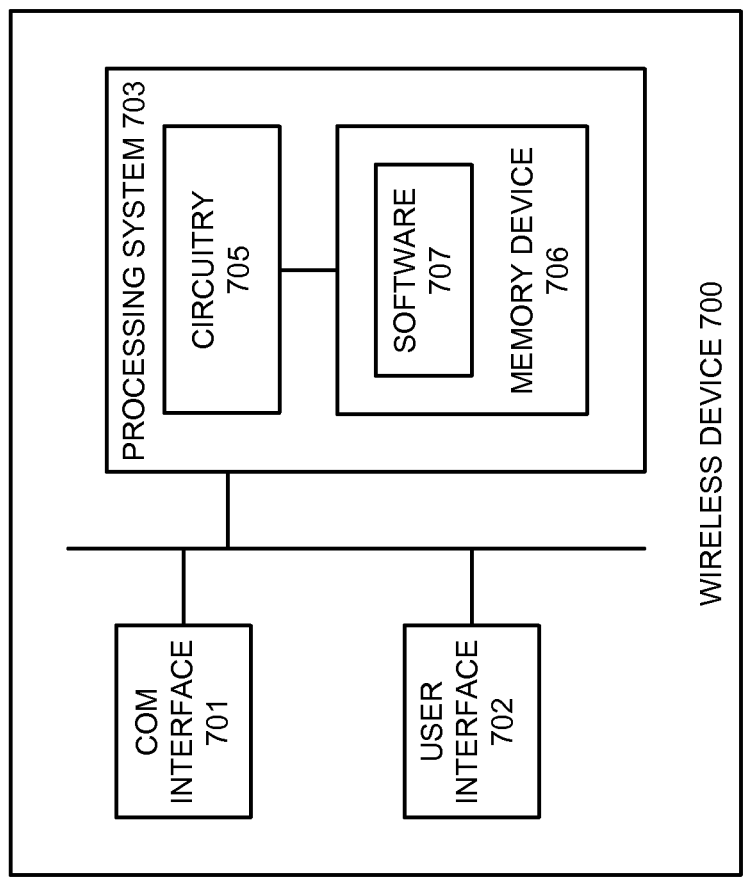
FIG. 7 illustrates a wireless communication device.

FIG. 7 illustrates wireless device 700. Wireless device 700 is an example of wireless devices 101 and 401 although wireless devices 101 and 401 may use alternative configurations. Wireless communication device 700 comprises wireless communication interface 701, user interface 702, and processing system 703. Processing system 703 is linked to wireless communication interface 701 and user interface 702. Processing system 703 includes processing circuitry 705 and memory device 706 that stores operating software 707. Wireless communication device 700 may include other well-known components such as a battery and enclosure that are not shown for clarity. Wireless communication device 700 may be a telephone, computer, e-book, mobile Internet appliance, media player, game console, wireless network interface card, or some other wireless communication apparatus—including combinations thereof.

Wireless communication interface 701 comprises RF communication circuitry and an antenna. The RF communication circuitry typically includes an amplifier, filter, RF modulator, and signal processing circuitry. Wireless communication interface 701 may also include a memory device, software, processing circuitry, or some other communication device. Wireless communication interface 701 may use various protocols, such as CDMA, EVDO, WIMAX, GSM, LTE, WIFI, HSPA, or some other wireless communication format.

User interface 702 comprises components that interact with a user to receive user inputs and to present media and/or information. User interface 702 may include a speaker, microphone, buttons, lights, display screen, touch screen, touch pad, scroll wheel, communication port, or some other user input/output apparatus—including combinations thereof. User interface 702 may omitted in some examples.

Processing circuitry 705 comprises microprocessor and other circuitry that retrieves and executes operating software 707 from memory device 706. Memory device 706 comprises a disk drive, flash drive, data storage circuitry, or some other memory apparatus. Processing circuitry 705 is typically mounted on a circuit board that may also hold memory device 706 and portions of communication interface 701 and user interface 702. Operating software 707 comprises computer programs, firmware, or some other form of machine-readable processing instructions. Operating software 707 may include an operating system, utilities, drivers, network interfaces, applications, or some other type of software. When executed by processing circuitry 705, operating software 707 directs processing system 703 to operate wireless communication device 700 as described herein.

In particular, communication interface 701 exchanges communications with a wireless communication network during an initial period of time. Communication interface 701 transfers an initial location of wireless device 700 during the initial period of time to an authorization system for the wireless communication network. During a second period of time, communication interface 701 transfers a registration request indicating a confirmation location and a location of wireless device 700 during the second period of time to the authorization system.

Figure 8:
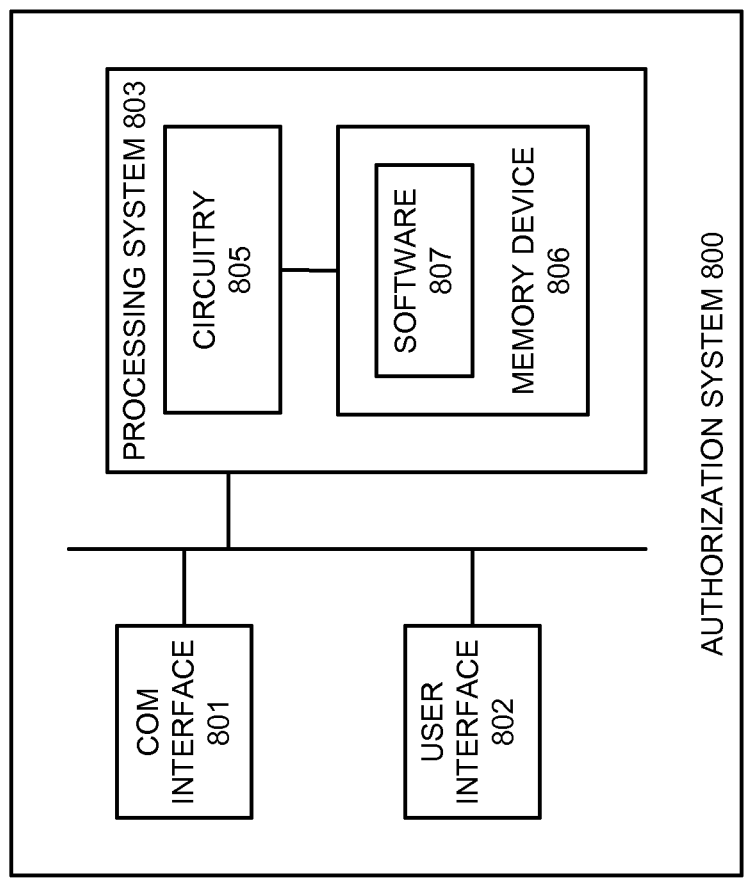
FIG. 8 illustrates an authorization system.

FIG. 8 illustrates authorization communication system 800. Authorization system 800 is an example of authorization system 106 and HLR/AC 406, although authorization system 106 and HLR/AC 406 may use alternative configurations. Authorization system 800 comprises communication interface 801, user interface 802, and processing system 803. Processing system 803 is linked to communication interface 801 and user interface 802. Processing system 803 includes processing circuitry 805 and memory device 806 that stores operating software 807.

Communication interface 801 comprises components that communicate over communication links, such as network cards, ports, RF transceivers, processing circuitry and software, or some other communication devices. Communication interface 801 may be configured to communicate over metallic, wireless, or optical links. Communication interface 801 may be configured to use TDM, IP, Ethernet, optical networking, wireless protocols, communication signaling, or some other communication format—including combinations thereof.

User interface 802 comprises components that interact with a user. User interface 802 may include a keyboard, display screen, touch screen, mouse, touch pad, or some other user input/output apparatus. User interface 802 may be omitted in some examples.

Processing circuitry 805 comprises microprocessor and other circuitry that retrieves and executes operating software 807 from memory device 806. Memory device 806 comprises a disk drive, flash drive, data storage circuitry, or some other memory apparatus. Operating software 807 comprises computer programs, firmware, or some other form of machine-readable processing instructions. Operating software 807 may include an operating system, utilities, drivers, network interfaces, applications, or some other type of software. When executed by circuitry 805, operating software 807 directs processing system 803 to operate authorization system 800 as described herein.

In particular, during an initial period of time, communication interface 801 receives an initial location of a wireless device during the initial period of time from the wireless device. During a second period of time, communication interface 801 receives a registration request indicating a confirmation location and a location of the wireless device during the second period of time from the wireless device. Operating software 807 directs processing system 803 to process the registration request to validate the confirmation location based on the initial location. If the confirmation location is validated based on the initial location, processing system 803 allows the wireless device to register with the wireless communication network during the second period of time.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication system comprising:
   exchanging communications between a wireless device and a wireless communication network during an initial period of time;
   transferring an initial location of the wireless device during the initial period of time and an initial random number from the wireless device to an authorization system for the wireless communication network;
   storing the initial location in the wireless device as a confirmation location;
   during the second period of time, transferring a registration request indicating the confirmation location, a confirmation number, a second random number, and a location of the wireless device during the second period of time from the wireless device to the authorization system;
   in the authorization system, processing the registration request to validate the confirmation location based on the initial location by determining whether the confirmation location matches the initial location and to validate the confirmation number based on the initial random number; and
   if the confirmation location is validated based on the initial location and the confirmation number is validated based on the initial random number, allowing the wireless device to register with the wireless communication network during the second period of time.

2. The method of claim 1 further comprising:
during a third period of time, transferring a second registration request indicating a second confirmation location and a location of the wireless device during the third period of time from the wireless device to the authorization system;
in the authorization system, processing the second registration request to validate the second confirmation location based on the location of the wireless device during the second period of time; and
if the second confirmation location is validated based on the location of the wireless device during the second period of time, allowing the wireless device to register with the wireless communication network during the third period of time.

3. The method of claim 1 wherein the initial location, the initial random number, and the registration request are encrypted before transference to the authorization system.

4. The method of claim 3 wherein the encryption uses Shared Secret Data (SSD) A.

5. The method of claim 4 wherein SSD_A is derived from the Cellular Authentication and Voice Encryption (CAVE) algorithm with an authentication key shared by the wireless device and the authentication system, a random SSD number (RAND_SSD) provided to the wireless device by the authorization system, and an electronic serial number for the wireless device.

6. The method of claim 1 wherein the registration request is encrypted using the confirmation number and the confirmation location before transference to the authorization system.

7. The method of claim 1 wherein the initial location and the location of the wireless device during the second period of time is determined by obtaining the Global Positioning System coordinates of the wireless device.

8. A wireless communication system comprising:
a wireless device configured to exchange communications with a wireless communication network during an initial period of time, transfer an initial location of the wireless device during the initial period of time and an initial random number to an authorization system for the wireless communication network, store the initial location in the wireless device for use during a second period of time as a confirmation location, and during the second period of time, transfer a registration request indicating the confirmation location, a confirmation number, a second random number, and a location of the wireless device during the second period of time to the authorization system;
the authorization system configured to process the registration request to validate the confirmation location based on the initial location by determining whether the confirmation location matches the initial location, validate the confirmation number based on the initial random number, and, if the confirmation location is validated based on the initial location and the confirmation number is validated based on the initial random number, allow the wireless device to register with the wireless communication network during the second period of time.

9. The wireless communication system of claim 8 further comprising:
the wireless device further configured to, during a third period of time, transfer a second registration request indicating a second confirmation location and a location of the wireless device during the third period of time to the authorization system;
the authorization system further configured to process the second registration request to validate the second confirmation location based on the location of the wireless device during the second period of time and, if the second confirmation location is validated based on the location of the wireless device during the second period of time, allow the wireless device to register with the wireless communication network during the third period of time.

10. The wireless communication system of claim 8 wherein the initial location, the initial random number, and the registration request are encrypted before transference to the authorization system.

11. The wireless communication system of claim 10 wherein the encryption uses Shared Secret Data (SSD) A.

12. The wireless communication system of claim 11 wherein SSD_A is derived from the Cellular Authentication and Voice Encryption (CAVE) algorithm with an authentication key shared by the wireless device and the authentication system, a random SSD number (RAND_SSD) provided to the wireless device by the authorization system, and an electronic serial number for the wireless device.

13. The wireless communication system of claim 8 wherein the registration request is encrypted using the confirmation number and the confirmation location before transference to the authorization system.

14. The wireless communication system of claim 8 further comprising:
the wireless device further configured to determine the initial location and the location of the wireless device during the second period of time by obtaining the Global Positioning System coordinates of the wireless device.

15. An authorization system for a wireless communication network comprising:
a communication interface configured to receive an initial location of a wireless device during an initial period of time and an initial random number, wherein the wireless device is exchanging communications with the wireless communication network during the initial period of time and stores the initial location in the wireless device for use during a second period of time as a confirmation location, and receive a registration request during the second period of time from the wireless device indicating the confirmation location, a confirmation number, a second random number, and a location of the wireless device during the second period of time;
a processing system configured to process the registration request to validate the confirmation location based on the initial location by determining whether the confirmation location matches the initial location, validate the confirmation number based on the initial random number, and, if the confirmation location is validated based on the initial location and the confirmation number is validated based on the initial random number, allow the wireless device to register with the wireless communication network during the second period of time.

16. The authorization system of claim 15 further comprising:
the communication interface further configured to receive a second registration request during a third period of time from the wireless device indicating a second confirmation location and a location of the wireless device during the third period of time;
the processing system further configured to process the second registration request to validate the second confirmation location based on the location of the wireless device during the second period of time and, if the second confirmation location is validated based on the location of the wireless device during the second period of time, allow the wireless device to register with the wireless communication system during the third period of time.

* * * * *